(12) United States Patent
Onuma et al.

(10) Patent No.: US 7,725,105 B2
(45) Date of Patent: May 25, 2010

(54) MOBILE SITE MANAGEMENT SYSTEM

(75) Inventors: Akiho Onuma, Tokyo (JP); Kenji Oshiba, Tokyo (JP)

(73) Assignee: Ubiquitous Business Technology, Inc., Tokyo (JP)

( * ) Notice: Subject to any disclaimer, the term of this patent is extended or adjusted under 35 U.S.C. 154(b) by 709 days.

(21) Appl. No.: 11/511,378

(22) Filed: Aug. 29, 2006

(65) Prior Publication Data

US 2007/0105550 A1  May 10, 2007

(30) Foreign Application Priority Data

Aug. 30, 2005  (JP) .............................. 2005-248770

(51) Int. Cl.
  *H04W 40/00* (2009.01)
  *H04W 24/00* (2009.01)
  *G06F 7/00* (2006.01)

(52) U.S. Cl. ............................. 455/428; 455/423; 707/1

(58) Field of Classification Search ................. 455/428, 455/423, 425, 412.1, 418, 419; 707/1; 709/213, 709/231
See application file for complete search history.

(56) References Cited

U.S. PATENT DOCUMENTS

| | | | |
|---|---|---|---|
| 6,473,894 B1 | 10/2002 | Shrader et al. | |
| 6,609,246 B1 | 8/2003 | Guhr et al. | |
| 7,343,420 B2 * | 3/2008 | Suzuki | 709/231 |
| 7,379,731 B2 * | 5/2008 | Natsuno et al. | 455/412.1 |
| 2001/0041566 A1 * | 11/2001 | Xanthos et al. | 455/423 |
| 2002/0059166 A1 * | 5/2002 | Wang et al. | 707/1 |
| 2002/0103818 A1 | 8/2002 | Amberden | |

FOREIGN PATENT DOCUMENTS

EP  1519540 A2  3/2005

OTHER PUBLICATIONS

European Search Report dated Aug. 13, 2009 for corresponding European Patent Application No. 06254507.4.
Jean-Baptiste Minchelli, "Introduction to the Microsoft Mobile Internet Toolkit", pp. 1-7, May 6, 2002.

* cited by examiner

*Primary Examiner*—Lester Kincaid
*Assistant Examiner*—Kuo Woo
(74) *Attorney, Agent, or Firm*—Brundidge & Stanger, P.C.

(57) ABSTRACT

Tasks of a contents provider are supported, and construction or change of a mobile site, which is accompanied with replacement or correction of contents, is easily executed. In a mobile site management system that manages a site of a portable terminal in a system that provides contents of the site to the portable terminal through a network from a contents provider, the mobile site management system includes an application server providing the contents of the site of the portable terminal; and an operation management server operating and managing the site handled by the application server. The operation management server includes first processing means for preparing the site of the portable terminal; second processing means for executing a test of the prepared site by accessing a predetermined related line; and third processing means for reporting information related to the site to the application server to open a site suitable for the test according to the second processing means onto the network.

22 Claims, 13 Drawing Sheets

FIG. 5

MANAGEMENT INFORMATION DB215

| | | | |
|---|---|---|---|
| 41 — SITE INFORMATION | SITE ID:A001 | BLOCK DEFINITION INFORMATION | PAGE DEFINITION INFORMATION |
| | SITE ID:A002 | BLOCK DEFINITION INFORMATION | PAGE DEFINITION INFORMATION |
| | ⁓ | ⁓ | ⁓ |
| 42 — CONTENTS MANAGEMENT INFORMATION | CONTENTS ID :B001 | WALLPAPER / MOVIE / RINGTONE / NEWS / APP1 / APP2 / SCREEN SAVER | |
| | CONTENTS ID :B002 | | |
| | ⁓ | ⁓ | |
| 43 — STATISTICAL INFORMATION | SITE ID:C001 | TRAFFIC AMOUNT OF WHOLE SITE/ NUMBER OF ACCESSES TO SITE PAGE DOWNLOAD OF CONTENTS/ | |
| | SITE ID:C002 | | |
| | ⁓ | ⁓ | |
| 44 — HANDSET INFORMATION | HANDSET ID:E002 | SCREEN SIZE/PERIPHERAL DOT/ HORIZONTAL DOT/CHORD | |
| | HANDSET ID:E002 | | |
| | ⁓ | ⁓ | |
| 45 — BLOCK DEFINITION INFORMATION | BLOCK DEFINITION ID:F001 | DRAW ○ | |
| | BLOCK DEFINITION ID:F002 | DRAW × | |
| | BLOCK DEFINITION ID:F003 | OUTPUT RINGTONE | |
| | BLOCK DEFINITION ID:F004 | OUTPUT NEWS | |
| | ⁓ | ⁓ | |

FIG. 10A

```
MS2
[TEST 2: | HOME | PREPARING ENGINE | CONTENTS | Hands | REPORTING | MONITORING |
         | ACCOUNT | USER GUIDE | LOG-OUT |
PAGE DISPLAY METHOD | DEFAULT |    |    |
PAGE IN SITE
                                            [Home]
PLACE OF PAGE TO BE DISPLAYED
THIS IS A TEST SITE (URL OF STAGING SITE http://
[PROMOTE TO PRODUCTION] [REVERT FROM PRODUCTION] [IMPORT/EXPORT OF SITE LAYOUT]
```

FIG. 10B

```
MS2
[TEST 2: | HOME | PREPARING ENGINE | CONTENTS | Hands | REPORTING | MONITORING |
         | ACCOUNT | USER GUIDE | LOG-OUT |
DRAWING PREPARING ENGINE-PAGE EDIT
DISPLAY BLOCK IN PAGE
CATEGORY OF BLOCK BLOCK        PAGE
TEXT         TEXT
PICTURE      CHANGE       [TOP]
INQUIRY      LINE         [UP]
LINK         INQUIRY
SECTION      LINK         [DOWN]
CHANGE       CHANGE       [BOTTOM]
LINE         ITEM
TEXT
                     [MOVE TO ANOTHER CONTAINER]
                     [DETACH FROM CONTAINER]

[TO EDIT OF BLOCK]
```

FIG. 10C

```
MS2
[TEST 2: | HOME | PREPARING ENGINE | CONTENTS | Hands | REPORTING | MONITORING |
         | ACCOUNT | USER GUIDE | LOG-OUT |
DRAWING PREPARING ENGINE-PAGE EDIT
PAGE NAME 1

[TEXT][PICTURE][SECTION][SECTION][TEXT]
PAGE NAME 1

[UPDATE]
```

FIG.11A

MS2
[TEST 2: | HOME | PREPARING ENGINE | CONTENTS | Hands | REPORTING | MONITORING |
| ACCOUNT | USER GUIDE | LOG-OUT |
DRAWING PREPARING ENGINE-PAGE EDIT
PAGE NAME 1

| TEXT | PICTURE | SECTION | SECTION | TEXT |

TEXT ROW:
URL FOR CUSTOM LINK :
ACCESS :
DISPLAY BEFORE LINK :
| UPDATE |

FIG.11B

MS2
[TEST 2: | HOME | PREPARING ENGINE | CONTENTS | Hands | REPORTING | MONITORING |
| ACCOUNT | USER GUIDE | LOG-OUT |
PAGE DISPLAY METHOD | DEFAULT | | |

PAGE IN SITE
    Home
    |
    X1

SELECT PAGE TO BE EDITED
THIS IS A TEST SITE (URL OF STAGING SITE http://
| PROMOTE TO PRODUCTION | REVERT FROM PRODUCTION | IMPORT/EXPORT SITE LAYOUT |

FIG.11C

MS2
[TEST 2: | HOME | PREPARING ENGINE | CONTENTS | Hands | REPORTING | MONITORING |
| ACCOUNT | USER GUIDE | LOG-OUT |
PAGE DISPLAY METHOD | DEFAULT | | |

PAGE IN SITE
    Home

| MS2 SITE SERVICE | TECH-NOLOGY OF U COMPANY | SUMMARY OF COMPANY | News |

SELECT PAGE TO BE EDITED
THIS IS A TEST SITE (URL OF STAGING SITE http://
| PROMOTE TO PRODUCTION | REVERT FROM PRODUCTION | IMPORT/EXPORT SITE LAYOUT |

| BLOCK NAME | ELEMENT |
|---|---|
| 1101 BASIC BLOCK | TEXT |
| | PICTURE (CENTER) |
| | S PICTURE |
| | LINK |
| | SECTION |
| | LINE FEED |
| 1102 DISPLAY BLOCK | MARQUEE |
| | SECTION |
| | Phone To |
| | Mail To |
| 1103 CONTENTS BLOCK | TOP RANKING |
| | CATEGORY |
| | SEARCH |
| | CONTENTS LIST |
| | NEW LIST |
| | INDEX LIST |
| | DOWNLOAD |
| 1104 ARTICLE BLOCK | TOP RANKING |
| | CATEGORY |
| | SEARCH |
| | CONTENTS LIST |

FIG.13

| MS2 [TEST 2: | HOME | PREPARING ENGINE | CONTENTS | Hands | REPORTING | MONITORING | ACCOUNT | USER GUIDE | LOG-OUT |] | | | | | | | | | |
|---|---|---|---|---|---|---|---|---|---|
| Wall paper life | | | | | | | | | |
| CONTENTS  () ☐ DISPLAY/PAGE PAGE 1 | | | | | | | | | |

| | PICTURE | CATEGORY | TITLE (ENGLISH/JAPANESE HIRAGANA CHARACTRES) | ARTIST (ENGLISH/JAPANESE HIRAGANA CHARACTRES) | AUTHOR | STATE | new | | width | height |
|---|---|---|---|---|---|---|---|---|---|---|
| ☐ | | ANIMAL | DOG | Y | X | production | | ☐ | 80 | 80 |
| ☐ | | ANIMAL | DOG | Y | X | production | | ☐ | 840 | 840 |
| ☐ | | SPORTS test | SOCCER | Y | X | production | new | ☐ | 240 | 240 |
| ☐ | | SPORTS test | SNOWBOARD | Y | X | production | new | ☐ | 240 | 240 |
| ☐ | | SPORTS | TENNIS | Y | X | production | new | ☐ | 240 | 240 |
| ☐ | | ANIMAL | CAT | Y | X | production | | ☐ | 640 | 480 |
| ☐ | | FLOWER | FLOWER 1 | Y | X | production | | ☐ | 640 | 480 |
| ☐ | | FLOWER | FLOWER 2 | Y | X | production | | ☐ | 480 | 840 |

MOBILE SITE MANAGEMENT SYSTEM

BACKGROUND OF THE INVENTION

1. Field of the Invention

The present invention relates to a mobile site management system, and more particularly, to a mobile site management system that executes contents management and construction and operation of a mobile site, including production or replacement of contents provided to a portable terminal such as a cellular phone and correction of a screen of the mobile site, and processing support of a contents provider that manages and operates the contents of the mobile sites.

2. Description of the Related Art

Recently, a user can enter a web site of a contents provider through a personal computer (PC) or a portable terminal such as a cellular phone, and can be provided with various services from the contents provider. In the case of the PC, the user can request HTML type contents files from the contents provider.

However, in the case of the cellular phone, communication providers (hereinafter, referred to as a carrier) respectively provide contents files of different types having no compatibility. For example, contents files for each carrier are described by languages such as CHTML (compact HTML), HDML, and MML (mobile markup language) similar to CHTML. For this reason, contents files prepared for a cellular phone of a specific carrier cannot be browsed by a cellular phone of another carrier. Even though the contents files are browsed by the cellular phone of another carrier, a defect occurs in output of contents such as image or music.

Furthermore, since there exist various kinds of cellular phones or cellular phone makers, layout of a screen or text type, picture quality of image, or display of a moving image is changed depending on the kinds of the cellular phones. Also, receiving melody or its sound quality is changed depending on the kinds of the cellular phones. For this reason, a provider should change or correct contents depending on various formats of the cellular phones per carrier or kind.

For example, Japanese Patent Application Laid-Open No. 2005-37432 (Patent Reference 1) discloses a technique for providing contents depending on deviation of the cellular phones or a user's taste. According to this technique, individual setting information including at least one of information for correcting deviation of a reproducing function of contents in the same kind of the cellular phone and information for changing reproduction setting of contents depending on users' tastes is transmitted from the cellular phone to a contents server, and the contents server converts the contents on the basis of the individual setting information and transmits the converted contents to a cellular phone of a request source.

[Patent Reference 1] Japanese Patent Application Laid-Open No. 2005-37432

Recently, management support services, such as preparing different mobile sites per carrier or kind of cellular phone and changing contents, are provided. However, these kinds of services are provided in such a manner that a mobile site is prepared or contents are changed by correcting programs one by one depending on a carrier or various kinds of cellular phones. For this reason, the services need much time and effort.

Recently, as competition among increasing contents providers becomes keen, it is important to introduce new contents or services to a mobile site and quickly correct change if the change in the mobile site occurs. To operate a production, the contents provider needs to replace contents with new ones by quickly correcting the site and to quickly open contents after executing a confirmation test under the exclusive use condition.

However, it takes much time to handle screen change of the mobile site one by one in accordance with correction of the program. This is inefficient in view of competition.

SUMMARY OF THE INVENTION

An object of the present invention is to provide a mobile site management system, a mobile site support system and method, and a program for the same, which support tasks of a provider for providing contents of a mobile site and easily perform construction or change of the mobile site.

Another object of the present invention is to provide a provider support system, which can execute a series of site management tasks in a short time cycle, such as screen change of a mobile site, a confirmation test, normal operation, and analysis report of the test result.

In a mobile site management system that manages a site of a portable terminal in a system that provides contents of the site to the portable terminal through a network from a contents provider, the mobile site management system includes an application server providing the contents of the site of the portable terminal; and an operation management server operating and managing the site handled by the application server, wherein the operation management server includes first processing means for preparing the site of the portable terminal; second processing means for executing a test of the prepared site by accessing a predetermined related line; and third processing means for reporting information related to the site to the application server to open a site suitable for the test according to the second processing means onto the network (claim 1).

Preferably, the operation management server further includes fourth processing means for collecting data related to an access status from the portable terminal to the site in actual operation of the application server and executing reporting for output of the collected data to a display unit.

Preferably, the mobile site management system further includes a management information data base (DB) for managing information of plural sites prepared by the first processing means of the operation management server, wherein the management information DB includes a site information area storing information of each site using an ID (site ID) given to each site as a key; a contents management information area managing contents inserted in the site by giving a contents ID to each content; and a portable terminal information area managing information of features of the portable terminal by giving a different terminal ID to each portable terminal, and the first processing means corrects the site by correcting the information related to the site referring to information of the site information area, the contents management information area, and the portable terminal information area.

Preferably, the management information DB further includes a statistical information area maintaining data showing the access status from the portable terminal to the site in actual operation of the application server to correspond to the site ID, and the fourth processing means obtains data corresponding to the selected site ID and executes reporting of an operation status per site ID referring to the statistical information area.

Preferably, the mobile site management system further includes a contents DB maintaining contents provided to the portable terminal, and a contents management server managing the contents DB and reading and registering the contents.

Preferably, the contents provider operates the application server, a company supporting the contents provider operates the operation management server, and the management information DB and the contents DB are referred to by the application server and the operation management server.

Preferably, the application server opens a site corresponding to a site ID maintained in the site management area of the management information DB onto the network.

An operation support system according to the present invention includes a server supporting tasks of a contents provider that operates an application server, the application server providing contents of a portable terminal, the server including first processing means for preparing a site of the portable terminal; second processing means for executing a test of the prepared site by accessing a predetermined related line; and third processing means for reporting information related to the site to the application server to open a site suitable for the test according to the second processing means onto a network; and a management information DB managing information of plural sites prepared by the first processing means by giving a unique ID (site ID) to each site (claim 8).

Preferably, the server further includes fourth processing means for collecting data related to an access status from the portable terminal to the site in actual operation of the application server and executing reporting for output of the collected data to a display unit.

Preferably, the management information DB includes a contents management information area managing contents inserted in each site by giving a contents ID to each content; a portable terminal information area managing information of features of the portable terminal by giving a different terminal ID to each portable terminal; and a statistical information area maintaining data showing the access status from the portable terminal to the site in actual operation of the application server to correspond to the site ID, wherein the first processing means corrects the site by correcting the information related to the site referring to information of the site information area, the contents management information area, and the portable terminal information area, and the fourth processing means obtains data corresponding to the selected site ID and executes reporting of an operation status per site ID referring to the statistical information area.

Preferably, the first processing means displays a corresponding site in a display unit, and prepares the site by optionally combining plural previously defined elements (blocks) constituting the site in accordance with instructions from an input unit.

Preferably, the management information DB further includes a block definition information area maintaining block definition information by giving different IDs (block IDs) to each block, and registers the block definition information related to the site prepared by the first processing means to correspond to the site ID.

An operation support system according to the present invention includes a server supporting tasks of a provider that operates a site of a portable terminal; a display unit displaying at least a screen of a mobile site; and an input unit executing input manipulation, wherein the server includes first processing means for displaying a corresponding site in the display unit and preparing the site by optionally combining plural previously defined elements (blocks) constituting the site in accordance with instructions of the input unit; second processing means for executing a test of the prepared site by accessing a predetermined related line; and third processing means for reporting information related to the site to the application server, which provides contents of the site, to open a site suitable for the test according to the second processing means onto a network (claim 13).

Furthermore, in an operation support system supporting tasks of a provider that operates a site of a portable terminal, the operation support system includes a display unit displaying at least a screen of a mobile site; an input unit executing input manipulation; first processing means for displaying a corresponding site in the display unit and preparing the site by optionally combining plural previously defined elements (blocks) constituting the site in accordance with instructions from the input unit; a management information DB managing information of plural sites prepared by the first processing means by giving a unique ID (site ID) to each site; second processing means for executing a test of the prepared site by accessing a predetermined related line; and third processing means for reporting information related to the site to the application server, which provides contents of the site, to open a site suitable for the test according to the second processing means onto a network (claim 14).

Preferably, the predetermined related line for testing the prepared site is a test application server executing the same process as that of the application server.

In any one system described above, a mobile site operation management program is executed on a server having a function for realizing the first to fourth processing means in any one of the above systems (claim 18).

Also, in a method for managing operation of a mobile site of a provider that provides contents of a site of a portable terminal, the method includes a first processing step of displaying a corresponding mobile site in a display unit and preparing the site by optionally combining plural previously defined elements (blocks) constituting the site in accordance with instructions from an input unit; a step of storing information of plural sites prepared in the first processing step in a management information DB by giving a unique ID (site ID) to each site; a test processing step of executing a test of the prepared site by accessing a predetermined related line; and a step of reporting information related to the site to an application server to open a site suitable for the test according to the test processing step onto a network.

According to the present invention, it is possible to effectively support tasks of a provider, which provides contents of a mobile site, and to easily execute construction or change of the mobile site, which is accompanied with replacement or correction of contents. Also, it is possible to execute a series of site management tasks in a short time cycle, such as screen change of a mobile site, a confirmation test, normal operation, and data analysis report according to the operation.

BRIEF DESCRIPTION OF THE DRAWINGS

FIG. 5 illustrates an example of a management information DB 215 in a support system 21 of a contents provider according to the embodiment of the present invention;

FIGS. 10A to 10C illustrate transition of screens A to C for preparing a mobile site according to the embodiment of the present invention;

FIGS. 11A to 11C illustrate transistion of screens A to C for preparing a mobile site according to the embodiment of the present invention;

FIG. 12 illustrates an example of a block for preparing a site according to the embodiment of the present invention; and FIG. 13 illustrates an example of a display screen of a contents list according to the embodiment of the present invention.

DETAILED DESCRIPTION OF THE PREFERRED EMBODIMENTS

The embodiments of the present invention will be described with reference to the drawings.

Figure 1:
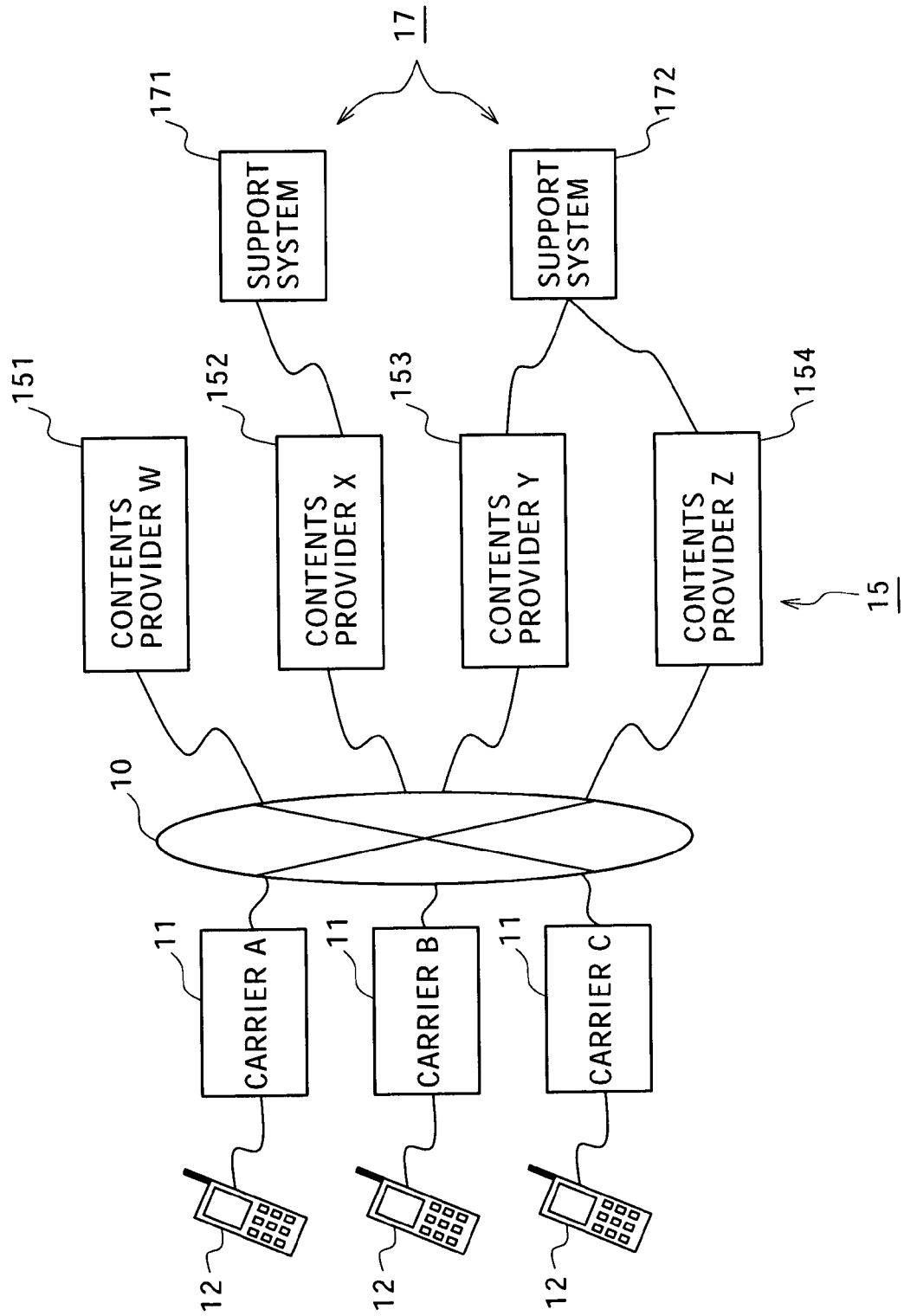
FIG. 1 illustrates a management system for providing contents to a mobile site of a cellular phone according to the embodiment of the present invention.

FIG. 1 illustrates an example of a contents management system of a mobile site according to the embodiment of the present invention.

Plural carriers 11 and plural contents providers 151~154 (hereinafter, referred to as 15 if not specified) are connected to a network 10 such as Internet. The contents providers 15 (hereinafter, simply referred to as "provider") keep contents such as various kinds of music, still images, moving images and various mobile sites having the contents, and provide the mobile sites and the contents to the carriers 11 through the network 10. A user subscribed to the carriers 11 can acquire the mobile sites to a cellular phone 12 or the contents of the mobile sites to view the contents.

In this embodiment, a system, which supports tasks of the provider, i.e., management such as construction and operation of the mobile site provided by the providers 151 to 154 and management and change of the contents, will be described. This support is realized by link between support systems 171 and 172 (hereinafter, simply referred to as 17 if not specified) and the providers 15. The support system 17 includes a server and a data base (hereinafter, simply referred to as DB) for the support.

Referring to FIG. 1, although not shown, the provider 151 has a support system therein to execute management such as construction and operation of the mobile site provided by the provider 151 and tasks such as management and change of the contents. The support system 171 supports tasks of a single provider 152 while the support system 172 supports two providers 153 and 154.

Furthermore, although the support system 17 is designated for convenience, the present invention is not limited to the support system.

Furthermore, in view of another aspect regarding the relation between the provider 15 and the support system 17, the provider 15 and the support system 17 may be provided in one company or a company having the support system 17 may be different from a company having the provider 15. The example of FIG. 1 can exist regardless of the fact that the provider 15 and the support system 17 are divided per company.

Furthermore, the relation between the provider 15 and the support system 17 and their constitution will be described later with reference to FIGS. 2 to 4.

Figure 2:
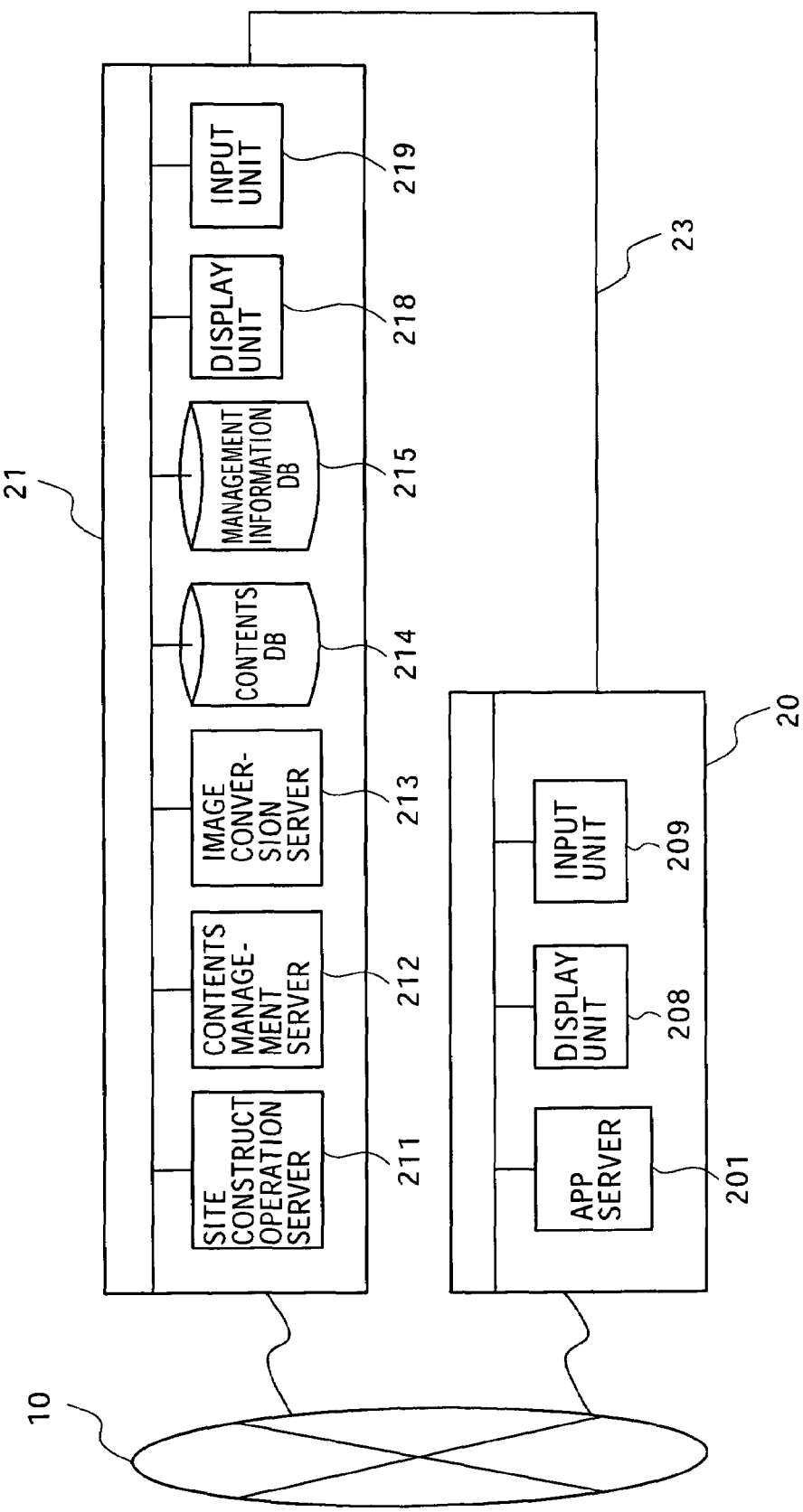
FIG. 2 illustrates an example of a contents provider and a support system according to the embodiment of the present invention.

FIG. 2 illustrates an example of the provider 15 and the support system 17. Referring to the example of FIG. 2, the relation between the provider and the support system and their constitution will be shown in the case where the provider 20 corresponds to the providers 152 to 154, and the support system 21 corresponds to the support systems 171 and 172.

The provider 20 and the support system 21 are connected with each other through the network 10. Although the cellular phone 12 can access desired providers 152 to 154 in accordance with designation of URL set per provider 20, it cannot access the support system 21. The support system 21 is connected to the provider 20 through the network. Also, the support system 21 may be connected to the provider 20 through an exclusive line 23.

The provider 20 includes an application server (hereinafter, referred to as APP server) 201 executing an application program for providing contents of the mobile site, and a display unit 208 displaying information used to execute the application program through the APP server 201, and an input unit 209 executing input manipulation. The APP server 201 includes a memory storing the application program for providing information of a site and contents selected by a request from the cellular phone 12, and a processor executing the program.

Any one provider 15 may provide the contents to plural carriers 11 in different formats. Accordingly, the provider 15 includes plural APP servers 201 or plural application programs to correspond to the carriers 11.

The support system 21 includes a site construction operation server 211, a contents management server 212, an image conversion server 213, a contents DB 214, a management information DB 215, a display unit 218, and an input unit 219.

The site construction operation server 211 prepares a mobile site provided by the APP server 201, and executes various kinds of tasks such as a task for correcting the mobile site. This will be described later.

The contents management server 212 executes management of contents stored in the contents DB 214. The contents DB 214 stores contents such as various kinds of music, still images, and moving images. A unique contents ID is given to the respective contents, and the contents management server 212 can manage the contents using a contents ID as a key.

The contents management server 212 executes tasks such as registration, update, and deletion of new contents to the contents DB 214. Also, in actual application, the contents management server 212 reads desired contents from the contents DB 214, and transmits the read contents to the APP server 201. For image conversion, some contents may be transmitted from the contents management server 212 to the image conversion server 213.

The image conversion server 213 executes format conversion of contents, for example, conversion from an image of the contents transmitted from the contents management server 212 to format and size optimized for the cellular phone. For example, the image conversion server 213 converts an image of JPEG format into an image of GIF format. Since no conversion may be needed depending on format and kind of the contents, the image conversion server 213 is not necessarily needed.

The management information DB 215 stores and manages distinctive information. In other words, the management information DB 215 manages information related to plural sites prepared by the site construction operation server 211. The management information DB 215 will be described later with reference to FIG. 4.

The display unit 218 and the input unit 219 may be a personal computer (PC), for example. The screen of the prepared or corrected mobile site is displayed in the display unit 218. The input unit 219 is manipulated to designate contents or various kinds of information to be reported in the mobile site displayed in the screen. Then, one site is prepared or corrected. Information showing the status of the operation is displayed in the display unit 218, and this will be described later. Also, the display unit 218 and the input unit 219 are not limited to the PC. The display unit 218 and the input unit 219 may be a portable terminal such as a cellular phone.

Although not shown in FIG. 2, either a portable terminal or a PC for a manager monitoring the operation or managing the status of the mobile site may be connected to the provider 20 and the support system 21. The PC or the portable terminal can access the site construction operation server 211 of the support system 21 or the APP server 201 by designating URL exclusively given to the manager.

Furthermore, only one provider 20 is shown in FIG. 2. If the support system 172 supports two providers 153 and 154, one provider 20 corresponds to 153, and another provider (for example, corresponding to 154) is not shown. However, it is to be understood that the constitution of another provider 154 and its connection relation with the support system 172 will be the same as mentioned above.

Figure 3:
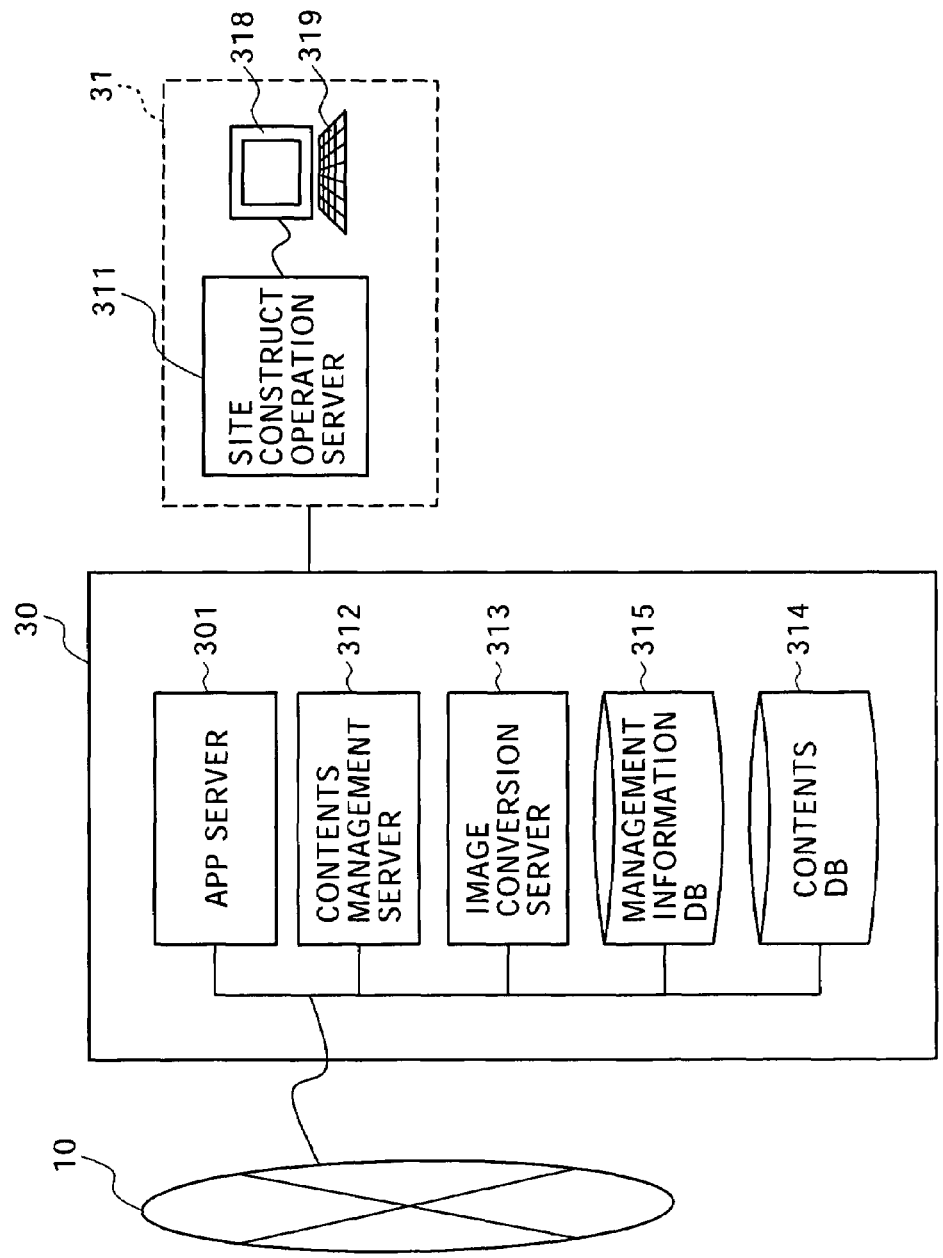
FIG. 3 illustrates another example of a contents provider and a support system according to the embodiment of the present invention.

FIG. 3 illustrates the provider 15 and the support system 17 according to another embodiment.

Referring to FIG. 3, the relation between the provider and the support system and their constitution will be shown in the case where the provider 30 corresponds to the providers 152~154 and the support system 31 corresponds to the support systems 171 and 172.

In this case, the provider 30 includes an APP server 301, a contents management server 312, an image conversion server 313, a contents DB 314, a management information DB 315, a display unit (not shown), and an input unit (not shown). Meanwhile, the support system 31 includes a site construction operation server 311 and a PC having a display unit 318 and an input unit 319.

Although the constitution and function of the respective server and DB are the same as those of FIG. 2, the provider and the support system are different from those of FIG. 2.

Figure 4:
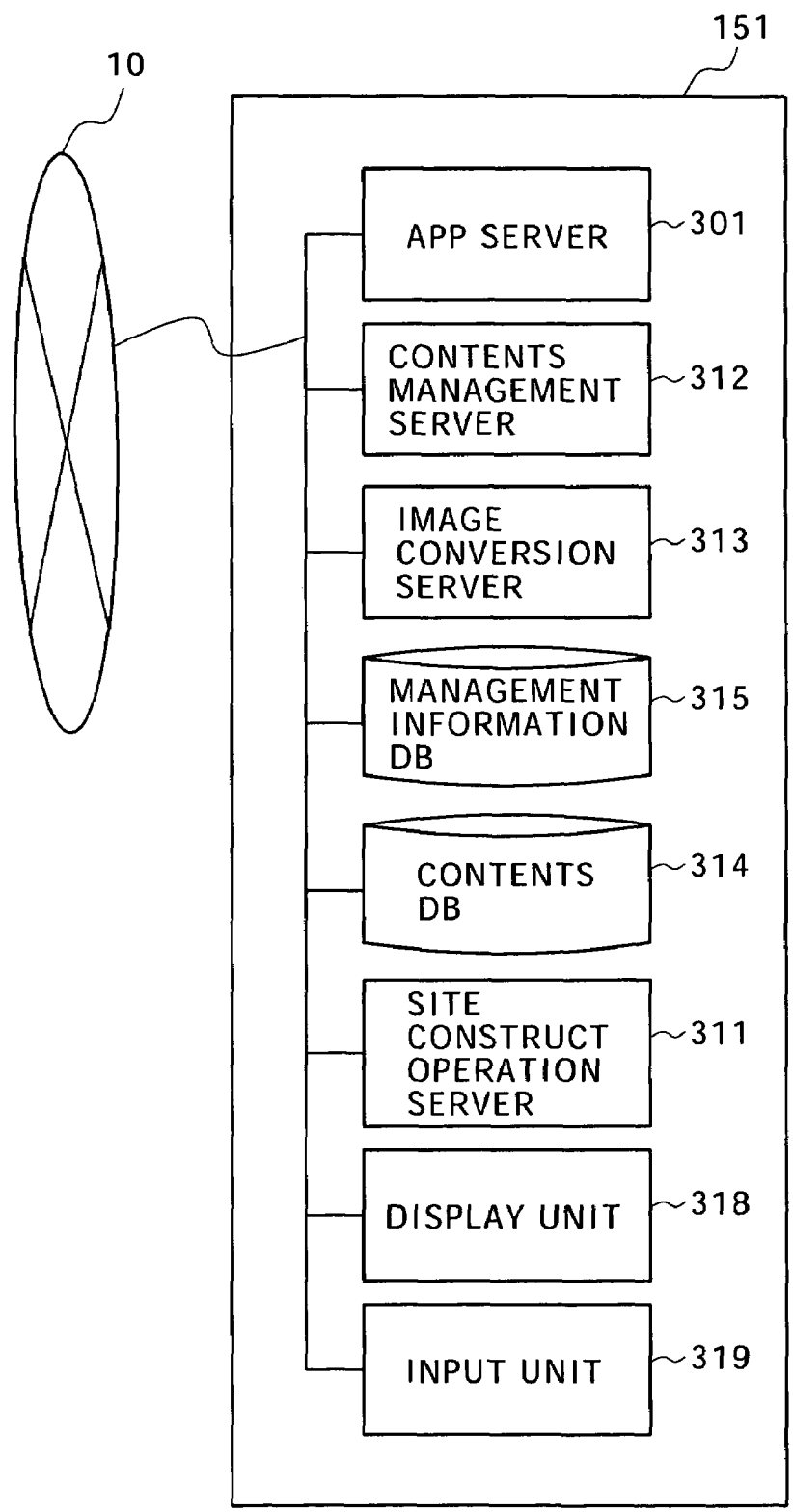
FIG. 4 illustrates another example of a contents provider and a support system according to the embodiment of the present invention.

FIG. 4 illustrates the provider 15 and the support system according to another embodiment.

Referring to FIG. 4, the provider corresponds to the provider 151, and the support system 31 (corresponding to FIG. 3) is provided in the provider 151.

In other words, the provider 151 includes an APP server 301, a contents management server 312, an image conversion server 313, a contents DB 314, and a management information DB 315. Also, the support system 31 includes a site construction operation server 311 and a PC having a display unit 318 and an input unit 319. Their elements are connected through an exclusive network or common network.

The constitution and function of the respective server and DB are the same as those of FIG. 3.

As understood by the examples referring to FIGS. 2 to 4, the APP server accessed from the cellular phone through the network 10 serves as a front end server. The site construction operation server, the contents management server, or the image conversion server serves as a back end server with respect to the APP server. Accordingly, it is to be understood that the site construction operation server, the contents management server, the image conversion server, and the contents DB or the management information DB may be at any one side of the provider and the support system. Also, the support systems 21 and 31 may be managed by a support company or the provider.

FIG. 5 illustrates the management information DB 215 of the support system 21.

The management information DB 215 includes a site information memory area 41 storing information of plural prepared mobile sites, a contents management information area 42 storing a contents ID stored in the contents DB 214, a statistical information area 43 storing data showing the status of access from the cellular phone to the site in actual application of the APP server 201 to correspond to a site ID, a handset information area 44 storing feature information of every cellular phone 12 handled by the carriers 11 to correspond to a handset ID, and a block definition information area 45 storing information reported in the site or information defining handling.

The site information memory area 41 registers block definition information and page definition information per site ID of the prepared cellular phone. Generally, it is assumed that the mobile site includes plural pages and plural blocks reported in each page. In other words, the blocks are display elements (including sound generating elements) that can be added to the page of the mobile site, and can properly be selected by input manipulation of a manipulator to prepare the page of the mobile site. In other words, the blocks may be referred to application arranged in the page of the mobile site.

The page definition information registered in the site information memory area 41 is identification information defining a page constituting a mobile site, and the block definition information is identification information registered in the block definition information area 45 showing the display element in the page.

The contents management information area 42 registers information for managing the contents registered in the contents DB 214 by designating a contents ID. By designating the contents ID, it is possible to report or download the contents to the site.

An example of a display screen of a list of registration completion contents (contents list) is shown in FIG. 13. The display screen is a contents list of the search result under the condition of a wallpaper. Desired contents can be selected from the contents list as a wallpaper of the mobile site. Also, an image such as dog or soccer player is displayed for preview in a column for image (not shown).

Referring to FIG. 5 again, the statistical information area 43 registers the status of access to each mobile site in normal operation, such as traffic amount to a corresponding mobile site, the number of accesses to a page of the site, blocks reported in the site, or statistical data including download of related contents (for example, link extension), to correspond to a site ID. Afterwards, the statistical information area 43 prepares reporting information per site ID on the basis of the stored data.

The handset information area 44 registers features of each cellular phone. For example, the handset information area 44 registers feature information of the cellular phone, such as the screen size of the cellular phone, the number of vertical dots of the screen, the number of horizontal dots of the screen, and kinds of chord, along with a handset ID.

The block definition information area 45 registers definition information of the blocks. For example, definition drawing a figure ○ (circle) is expressed as block definition ID:F001, definition drawing x is expressed as block definition ID:F002, and definition outputting receiving melody is expressed as block definition ID:F003.

For example, if a figure of a circle ○ is drawn in a page of the mobile site, the block definition ID:F001 is assigned to the page. However, some cellular phones may have no figure function of a circle ○ because software or hardware packaged in the cellular phones is different depending on the kind of the cellular phone. In such case, 0 (zero) or O (English letter) may be replaced with the circle ○. The features of a corresponding mobile site can be identified by referring to the block definition ID and the handset ID of the handset information 44, and unique figures of the corresponding mobile site can be generated.

In another example, a chord of a receiving melody of the cellular phone depends on the kinds of the cellular phone. For this reason, if the receiving melody is generated, the block definition ID:F003 is used. However, by referring to the handset ID, one kind of the cellular phone outputs the receiving melody at 16 chords while another kind of the cellular phone outputs the receiving melody at 40 chords.

As described above, the information displayed (output of the chords) in the screen of the mobile site can be displayed by combination of the contents ID, the handset ID, and the block definition ID. Also, the combination of the contents ID, the handset ID, and the block definition ID can properly be changed to prepare the mobile site of the cellular phone having various kinds of features. Moreover, even if the mobile site is corrected, the contents ID or the block definition ID may be replaced with another one to easily correct the mobile site.

Figure 6:
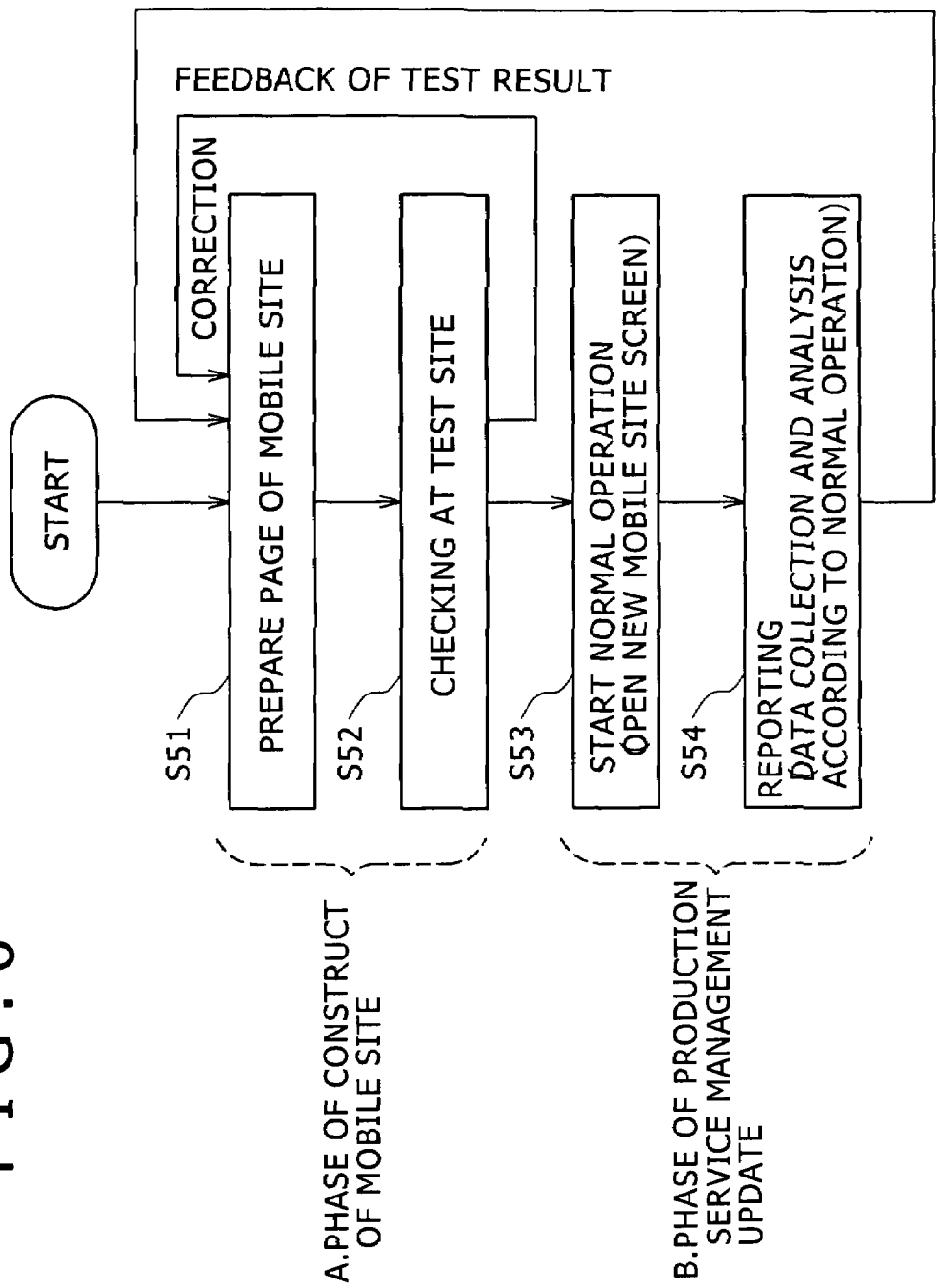
FIG. 6 illustrates a process flow of a site construction operation server according to the embodiment of the present invention.

FIG. 6 illustrates a process flow of the site construction operation server 211 that supports the contents provider in accordance with the embodiment of the present invention.

FIG. 6 illustrates the operation flow of allowing the support system 17 of the provider 15 to prepare and operate the site and support the contents management by using the server system 21 of FIG. 2, especially the site construction operation server 211 and the management information DB 215.

Contents of support tasks are divided into two phases. One phase is a construction phase A of the screen of the mobile site, and the other phase is a management phase B for normal operation and update of the constructed mobile site.

The construction phase A edits and produces the screen of the mobile site (S51). In this embodiment, the screen of the mobile site is constructed for the unit of page, and is combined with the display element called block to prepare the page. For example, the page is prepared by combination of block required for delivery of contents such as ranking display or new information. Also, a wallpaper of the screen or a receiving melody is added or a link with another site or contents is set, so that the page is prepared. This construction task (including correction) is executed by the display unit 318 and the input unit 319 of the support system along with display of the mobile site to be prepared in the screen of the display unit 318.

Figure 7:
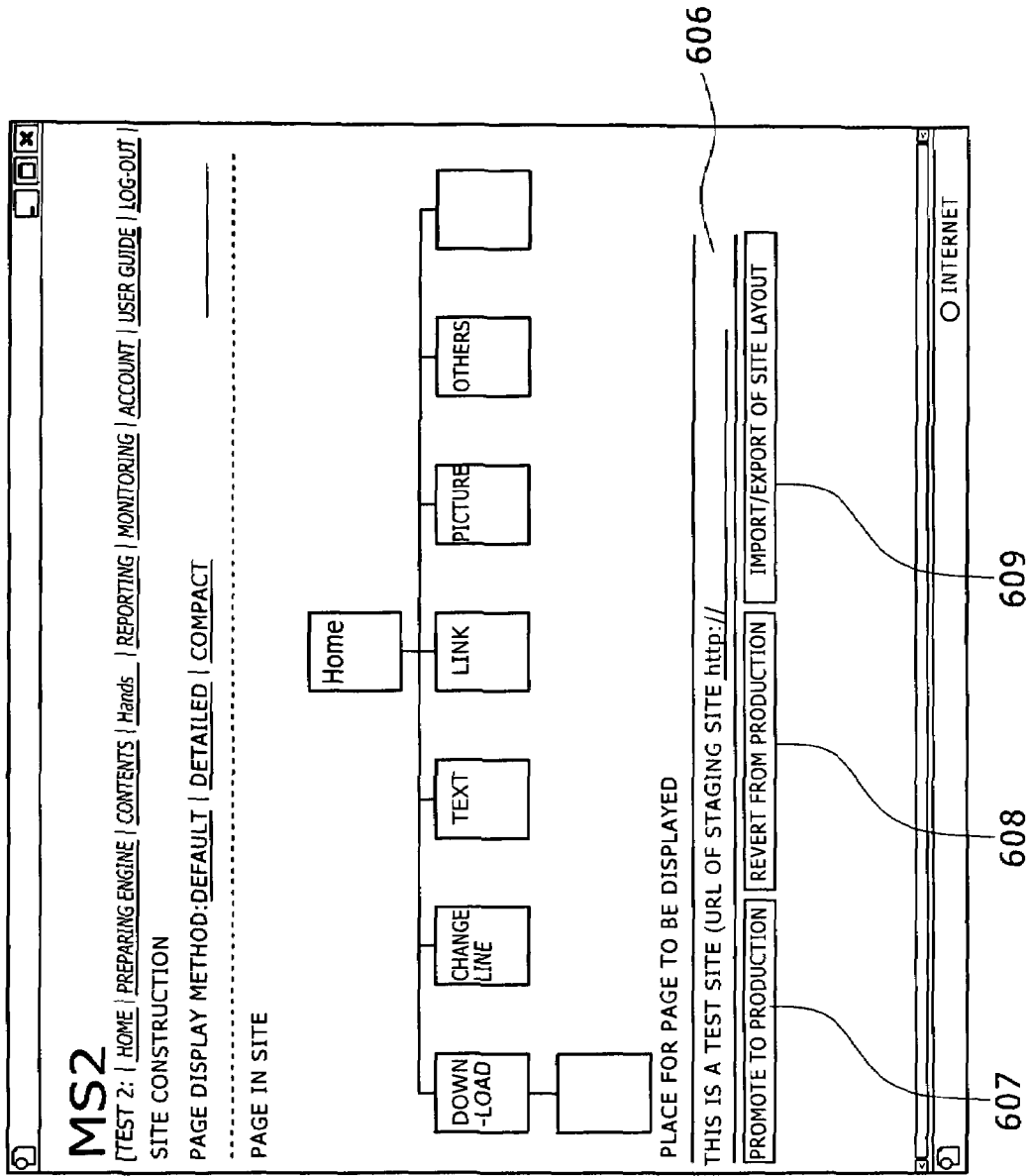
FIG. 7 illustrates an example of a screen for construction of a mobile site according to the embodiment of the present invention.

When a screen of a mobile site is roughly completed, a confirmation test is executed through access to a test site (S52). The test site is a test exclusive server having the same application as that of the APP server 201 used for normal operation, and is connected with the support system 21 through the network or the exclusive line. The test site has a unique URL. A general user is not allowed to access the test site but the support system 21 can access the test site to execute a test of the application. In other words, if the user clicks URL 606 set in the screen (FIG. 7) for site construction by manipulating the input unit 219, he/she can access the test site. Afterwards, the user sequentially executes the application (i.e., block definition) provided in the mobile site by manipulating the input unit 219, so as to check manipulation and operation of moving image, receiving melody or access to link, which is prepared under the environment similar to the actual operation.

As a result of the test confirmation, if a defect or a part to be corrected exists, the user should feedback it to correct the mobile site. For example, as a result of the test, if it is difficult to recognize text, or if a chord of a receiving melody is not set well, the user returns to a page preparing task of the mobile site (S51) and corrects the defect or the part to be corrected using the display unit 318 and the input unit 319. Then, the user again accesses the mobile site to the test site so as to execute the test confirmation.

As a result of the test confirmation, if a desired function or operation is satisfied, the user moves to phase B for normal operation and starts the normal operation (S53). To this end, the user clicks an item (607 of FIG. 7) "promote to production" set in the prepared screen. In the phase for normal operation, the prepared mobile site is opened to the public. Thus, the mobile site is accessed from the cellular phone 12, and contents related to the site are downloaded to the cellular phone.

As described above, the normally operated mobile site is accessed frequently, and operation information such as the number of accesses to the mobile site is stored in the management information DB 315 along with an ID of the mobile site. The operation information stored in the DB 315 is processed for reporting (S54). In other words, the site construction operation server 311 of FIG. 3 is provided with a program for preparing a graph, and the operation information stored in the management information DB by the program is read per ID of the mobile site to prepare a bar graph or a circular graph, and is displayed in the display unit 318.

Figure 8A:
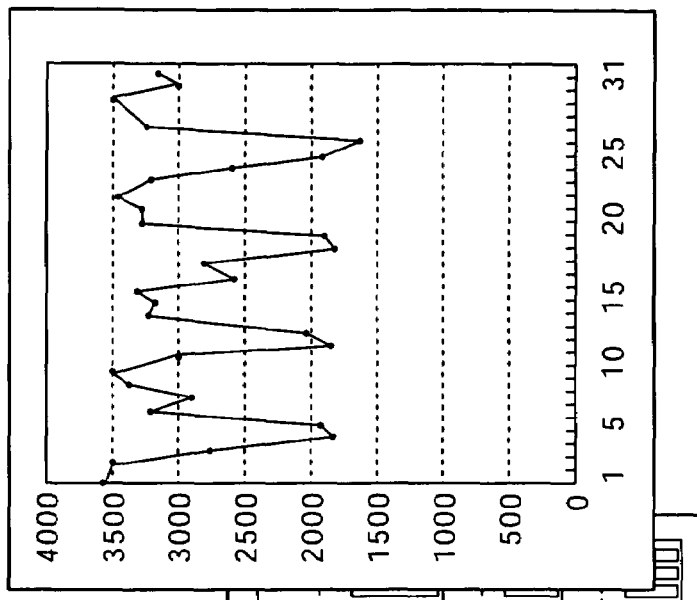
FIG. 8 illustrates an example of a display screen of reporting according to the embodiment of the present invention.
Figure 8B:
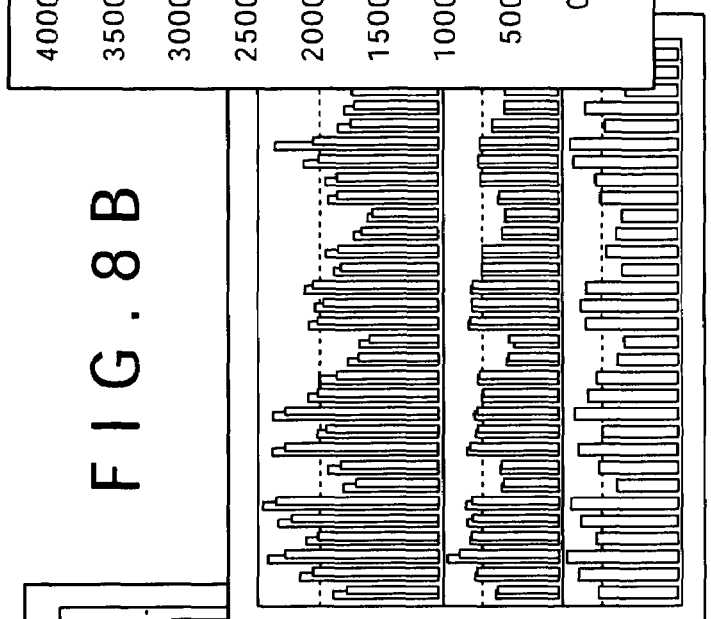
Figure 8C:
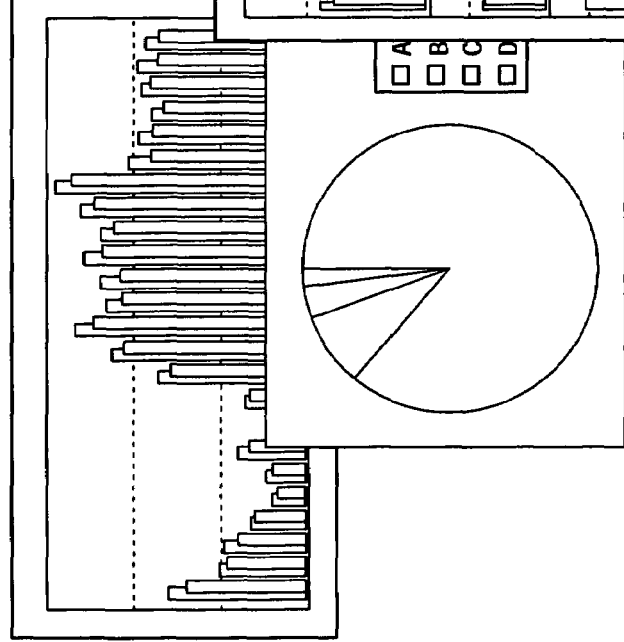

FIG. 8 illustrates an example of the display screen of reporting.

A graph showing the status of access per ID of the mobile site, per one hour (FIG. 8A), per day (FIG. 8B), or per month (FIG. 8C) is displayed. From this reporting status, the manager of the provider 15 may determine that contents stored in the mobile site of an ID having low frequency of access should be changed. In this case, the manager returns from the normal operation status to the construction phase A by clicking an item 608 "revert from production" in the screen (FIG. 7) for management of the mobile site which is normally operated. In this state, the manager can correct the mobile site.

Furthermore, if partial update or correction of the mobile site is executed periodically, as described above, the manager temporarily returns from the normal operation status to the construction phase A. In this state, the manager executes correction or update of the mobile site. Afterwards, the manager clicks the item 607 "promote to production" to open the mobile site as the production.

Furthermore, although FIG. 5 illustrates a flow chart of the process of the site construction operation server 211, this server 211 includes a site preparing processing means for preparing and correcting the mobile site through execution of the program, a correction management processing means for correcting and managing contents provided to the mobile site, a test processing means for executing a test by accessing a predetermined test site, a normal operation processing means for executing normal operation by accessing the APP server, and a reporting processing means.

As described above, the mobile site has been constructed by combination of handling elements of contents, which are called blocks, to correspond to the screens (contents screens)

of the mobile sites of the various kinds of the cellular phones and the plural carriers. Accordingly, it is possible to easily execute tasks of preparation or correction of the mobile site, for example, rearrangement or replacement of display and correction of a chord of a receiving melody, in a short time.

In other words, the mobile site has been conventionally prepared or corrected in such a manner that application programs have been prepared and corrected one by one. However, in this embodiment, correction of the programs is not required, and the mobile site can be constructed for a short time by proper combination or change of display elements (blocks) of the mobile site. Although it takes one to two weeks to correct the programs according to the conventional method, it takes one hour per mobile site according to this embodiment.

Furthermore, in this embodiment, since construction or correction of the mobile site can quickly be executed, a series of cycles such as test confirmation, normal operation and reporting can be shortened, and actual operation information can be obtained very quickly to update the mobile site. According to the conventional method, since actual operation is executed after one to two weeks, reporting is delayed and one cycle becomes long. Accordingly, it is difficult for the conventional method to keep up with competition of the mobile sites. According to the construction operation method of this embodiment, a very quick operation cycle can be realized.

Subsequently, referring to FIG. 9, the process of preparing a site using the site preparing processing means of the site construction operation server 211 will be described.

Figure 9A:
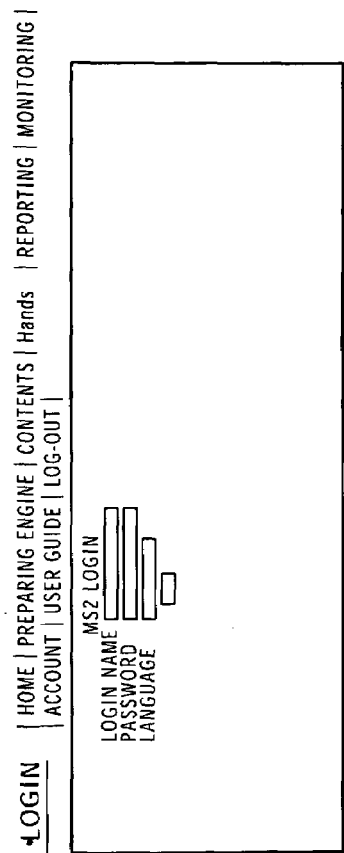
FIG. 9 illustrates an example of an initial screen according to the embodiment of the present invention.

FIG. 9A illustrates an initial screen displayed in the display unit 218, wherein a login button is manipulated by input of information such as login name and password to access the site construction operation server 211 or the contents management server 212.

Figure 9B:
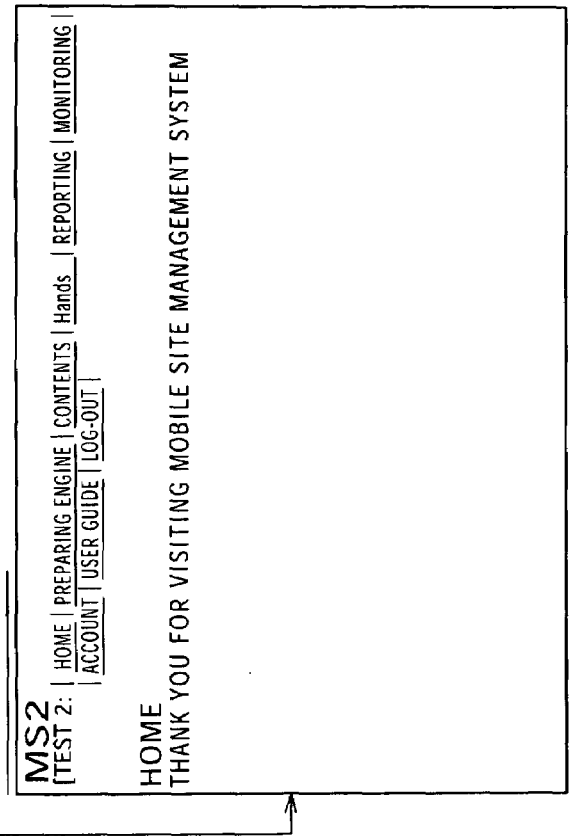

FIG. 9B illustrates an initial management screen displayed after actuation. Items displayed in an upper side of the screen, such as "home", "preparing engine", "contents" and "reporting", are manipulated to actuate each processing means. The preparing engine on the screen indicates the site preparing processing means, and designation of the preparing engine provides an empty home page that can add contents. Also, an item of the contents is a contents management function, and serves to upload a wallpaper of the site or a receiving melody to the contents DB 214.

Furthermore, if the preparing engine is designated, the preparing processing of the site is executed, and a top screen A of the preparing engine is displayed as shown in FIG. 10. If the user accesses the site, a first page (where "home" is displayed) is prepared and displayed. Afterwards, a block of contents constituting the screen of the site below "home" is additionally selected, so that the site is finally prepared.

The block is a unit constituting the mobile site according to the embodiment of the present invention. One mobile site is prepared by combination of elements selected from plural elements.

FIG. 12 illustrates an example of the block.

The block is divided into categories such as basic, display, contents, and report.

The basic block 1101 is a basic contents item that can be added to anywhere the site. The basic block includes text, image (displayed in the center), S image, link, section, and line feed.

The text is a block of a text arranged in a page which is being edited. The image (center) is image in server or Internet. The link is selected, and title is input to the image, so as to designate a substitute text. S image is similar to the image but is used if its position is not previously set.

The link is used if a text link is added to the page in the site or a portal of the provider, a new page to be prepared is added, and URL link is designated. The section is used when a contents block element is visually divided. The change of line is a blank line used when the contents block element is visually divided.

The display block 1102 includes marquee, sectional line, Phone To, and Mail To. The marquee is used when a background color, a scroll direction, a scroll operation are set. The sectional line is generated using HTML, and is used when a width, a color, and the like of a divider are designated. The Phone To and the Mail To respectively form links that prepare phone and mail.

The contents block 1103 includes top ranking, category, search, contents list, index list, and download. For example, the top ranking displays download link relating to the most popular thing among contents such as ringtone or receiving standby image in the site. The category displays ringtone and receiving standby image. The search displays a search form for allowing the user to search contents, such as ringtone or receiving standby image, from artists or title. The contents list displays ringtone or receiving standby image belonging to the designated category. The index list displays link index in alphabetical order to refer to ringtone or receiving standby image in the category. The download displays a link for downloading contents such as ringtone or receiving standby image.

The article block 1104 includes top ranking, category, search, and contents list. The top ranking displays link to the most popular report item. The category displays a list of all the report categories defined by the contents provider. The search displays a category, i.e., a text field that can allow the user to search report contents items. The contents list displays all the report contents items of a contents category. For example, an example of a contents list corresponding to the search result under the condition of wallpaper is shown in FIG. 13.

Furthermore, referring to FIG. 10, if the user clicks the page of "home" displayed in the screen A, the current screen moves to a page edit screen such as a screen B. In the screen B, "basic" is selected as the category of the block, and six elements defined as basic blocks are displayed. If one of the basic elements is determined, a page element is displayed at the left of the determined basic element in a list format. In this state, the user rearranges elements in the page while manipulating items such as "delete", "to top" and "to up". Finally, if the user manipulates an item "to edit of block", the current screen moves to an edit screen (for example, screen C) of each element.

The screen C is to prepare contents of the elements, and inputs text and uploads image. For example, the text item is designated to set a page title, and a text row "how are you, this is U bit" is input. Then, the image item can be designated to select edit contents, and the image title can be input in a text format.

As described above, text or image is selected per element of a page to be edited, whereby the elements of the page can be edited.

The screen D (see FIG. 11A) is a manipulation screen for preparing a new page by selecting a link of elements from "home". If items relating to the link, such as "link", "text row" and "URL for custom link" are set and a key "update" is manipulated, a new page of a link line is prepared. In this example, the screen E including a display of a block corresponding to page "X1" of the link line is displayed.

Subsequently, a block of the page "X1" is selected to exchange manipulation of the screens B to E, and a title of the page "X1" is determined and at the same time element of the contents block included in this page and its arrangement are determined.

The aforementioned manipulation is repeated to prepare the mobile site as shown in the screen F (see FIG. 11C). The screen F is an example of a site screen from U company. Each block is clicked so that elements of the contents provided in each block are displayed or output vocally.

The site prepared as above is provided with a unique ID (site ID), and is registered in the management information DB 215. For example, as shown in FIG. 5, block definition information and page definition information provided in a corresponding site are registered in a site ID "A001".

In this case, if URL item 101 of the prepared site A001 (FIG. 11C) is manipulated, the mobile site is accessed to the test site, whereby test of the mobile site is executed.

After the test ends, if the item 102 is manipulated, the site A001 updates to a formal site and then is opened to network. For this reason, the site is accessed from the cellular phone 12 to the provider 15, and related information of the mobile site A001 is read from the management information DB 215 under the processing of the APP server 201 and is downloaded to the cellular phone 12.

As described above, while the embodiments of the present invention have been described, the present invention is not limited to the aforementioned embodiments. It will be apparent to those skilled in the art that various modifications and variations can be made in the present invention without departing from the spirit or scope of the inventions.

For example, in the aforementioned embodiment, although the site of the cellular phone 12 obtained by the carriers 11 has been constructed and operated, it is to be understood that a site of the cellular phone to which contents are provided through a general network may be constructed and operated.

Furthermore, the provider and the support system shown in FIGS. 2 and 3 are exemplarily described. In addition to the provider and the support system, various modifications can be made.

Furthermore, since the management area DB 215 is exemplarily described, various modifications can be made. For example, while physically independent servers, i.e., the site construction operation server 211, the contents management server 212, and the image conversion server 213 have been described, a single server can be provided to maintain corresponding software.

What is claimed is:

1. A mobile site management system that manages a site of a portable terminal in a system that provides contents of the site to the portable terminal through a network from a contents provider, the mobile site management system comprising:
    an application server that executes an application for providing the contents of the site of the portable terminal through access from the portable terminal; and
    an operation management server that serves as a back end server with respect to the application server and manages operation of the site handled by the application server,
    wherein the operation management server cannot be accessed from the portable terminal through the network,
    wherein the operation management server comprises:
    first processing means for preparing the site of the portable terminal by combining a plurality of previously defined elements (blocks) constituting the site;
    second processing means for executing a test of the prepared site while coupling to a test server that has the same application as that of the application server; and
    third processing means for sending information related to the site to the application server to open a site suitable for the test according to the second processing means onto the network when a desired function and operation to the prepared site is satisfied as a result of the test by the second processing means.

2. The mobile site management system according to claim 1, wherein the operation management server further comprises a display unit and fourth processing means for collecting data related to an access status from the portable terminal to the site in actual operation of the application server and executing reporting for output of the collected data to the display unit.

3. The mobile site management system according to claim 1, further comprising:
    a management information database (DB) for managing information of a plurality of sites that were prepared by the first processing means and satisfies the desired function and operation according to the test by the second processing means in the operation management server,
    wherein the management information DB comprises:
        a site information area that stores information defining the block constituting a screen of each site given to each site, the block including a display element and a sound generating element that may add to the screen of the site, and each block being assigned a block definition ID;
        a contents management information area managing contents inserted in the site by giving a contents ID to each of the contents; and
        a portable terminal information area managing information of features of the portable terminal by giving a different terminal ID to each portable terminal, and
    wherein the first processing means produces the screen of the site by combining the block definition ID, the content ID, and the terminal ID, and corrects the site by correcting the information related to the site referring to information of the site information area, the contents management information area, and the portable terminal information area.

4. The mobile site management system according to claim 3,
    wherein the management information DB further comprises:
        a statistical information area maintaining data showing the access status from the portable terminal to the site in actual operation of the application server to correspond to the site ID, and
    wherein the fourth processing means obtains data corresponding to the selected site ID and executes reporting of an operation status per site ID referring to the statistical information area.

5. The mobile site management system according to claim 1, further comprising:
    a contents DB maintaining contents provided to the portable terminal; and
    a contents management server managing the contents DB and reading and registering the contents.

6. The mobile site management system according to claim 1, wherein the contents provider operates the application server, a company supporting the contents provider operates the operation management server, and the management information DB and the contents DB are referred to by the application server and the operation management server.

7. The mobile site management system according to claim 3, wherein the application server opens the site corresponding to the site ID maintained in the site information area of the management information DB onto the network.

8. An operation support system supporting tasks of a provider, wherein an application server operates a site of a portable terminal to provide contents of the site to the portable terminal, the operation support system comprising:
   an operation management server that serves as a back end server to the application server to support operation of the application server,
   wherein the operation management server cannot be accessed from the portable terminal through the network:
   a display unit that displays at least a screen of a mobile site;
   an input unit that executes input manipulation; and
   a management information database (DB) that stores management information of a plurality of sites having a unique site ID assigned to each site, a contents management information that manages contents inserted in the site having a unique contents ID assigned to each of the contents, and block definition information having a unique block ID assigned to each block that may constitute a screen of the site,
   wherein the operation management server comprises:
      first processing means for producing the site by using at least the contents management information and the block definition information in accordance with instructions from the input unit;
      second processing means for coupling to a test server that has the same application as that of the application server and executing a test of the produced site; and
      third processing means for sending information related to the site to the application server to open a site suitable for the test according to the second processing means onto a network when a desired function and operation to the prepared site is satisfied as a result of the test by the second processing means.

9. The operation support system according to claim 8, wherein the server further comprises:
   fourth processing means for collecting data related to an access status from the portable terminal to the site in actual operation of the application server and executing reporting for output of the collected data to a display unit.

10. The operation support system according to claim 8, wherein the management information DB comprises:
   a site information area that manages a plurality of site information with each of the site ID, each site being defined by using a plurality of the block definition information, the block definition information including a display element and a sound generating element that may add to the screen of the site and each block being assigned a block definition ID;
   a contents management information area managing contents inserted in the site with the contents ID to each content;
   a portable terminal information area managing information of features of the portable terminal by giving a different terminal ID to each portable terminal; and
   a statistical information area maintaining data showing an access status from the portable terminal to the site in actual operation of the application server, which provides contents managed by the provider, to correspond to the site ID.

11. The operation support system according to claim 10, wherein the first processing means produces the screen of the site by combining the block definition ID, the content ID, and the terminal ID, and corrects the site by correcting the information related to the site referring to information of the site, the contents management information, and the portable terminal information in the management information DB, and
   wherein the operation management server further comprises:
   fourth processing means for obtaining data corresponding to the selected site ID and for executing reporting of an operation status per site ID referring to the statistical information area.

12. The operation support system according to claim 8, wherein the operation management server further comprises:
   means for reverting the site from the normal operation status that is accessible from the portable terminal through the network, and
   wherein said first processing means changes the site by changing a combination of the contents management information and the block definition information.

13. The operation support system according to claim 8, wherein said first processing means produces the screen of the mobile site per page by combining with the display element being defined as a block while referring the contents management information in the management information DB.

14. The operation support system according to claim 8, wherein said test server has a unique uniform resource locator (URL) and said second processing means couples to the test server by pointing out through the input unit the URL displayed in the display unit.

15. The method according to claim 14, wherein many kinds of the display elements corresponding to various kinds of cellular phones and a plurality of carriers are previously prepared as their contents management information in the management information DB.

16. A computer program product for mobile site operation management, the computer program product comprising:
   a computer program executed on a server for supporting tasks executed by an application server of a provider that operates a site of a portable terminal to provide contents of the site to the portable terminal; and
   a computer-readable storage medium having the computer program tangibly embodied thereon, wherein the computer program causes the server to;
   store in a management information database (DB) management information of a plurality of sites having a unique site ID assigned to each site, contents management information that manages contents inserted in the site having a unique contents ID assigned to each of the contents, and block definition information having a unique block ID assigned to each block that may constitute a screen of the site;
   display a mobile site in a display unit;
   produce the site by using at least the contents management information and the block definition information in accordance with instructions from an input unit;
   store information of a plurality of sites produced in the management information DB by giving a unique site ID to each site;
   couple to a test server that has the same application as that of the application server and executing a test of the produced site; and send information related to the site to an application server of the provider to open a site suitable for the test onto a network when a desired function and operation to the produced site is satisfied as a result of the test.

17. A method for managing operation of a mobile site of a provider that provides contents of a site of a portable terminal, the method comprising:

providing previously a management information database (DB) that stores management information of a plurality of sites having a unique site ID assigned to each site, contents management information that manages contents inserted in the site having a unique contents ID assigned to each of the contents, and block definition information having a unique block ID assigned to each block that may constitute a screen of the site;

displaying a mobile site in a display unit; and producing the site by using at least the contents management information and the block definition information in accordance with instructions from an input unit;

storing information of a plurality of sites produced in the management information DB by giving a unique ID (site ID) to each site;

coupling to a test server that has the same application as that of the application server and executing a test of the produced site; and sending information related to the site to an application server of the provider to open a site suitable for the test onto a network when a desired function and operation to the produced site is satisfied as a result of the test.

18. The method according to claim 17, further comprising:
collecting data related to an access status from the portable terminal to the sites in actual operation of the application server and reporting for output of the collected data to the display unit to show the status of access per each the site ID.

19. The method according to claim 17, further comprising:
changing the site by correcting the information related to the site referring to information of the site information, the contents management information, and the portable terminal information,
wherein the changed site is coupled to the test server to execute the test of the changed site.

20. The method according to claim 17, further comprising:
reverting the site from the normal operation status that is accessible from the portable terminal through the network; and
changing the site by changing combination of the contents management information and the block definition information of the site reverted.

21. The method according to claim 17, wherein the screen of the mobile site per page is produced by combining with the display element being defined as a block while referring to the contents management information in the management information DB.

22. The method according to claim 17, wherein the mobile site is produced or changed by proper combination or change of display elements being defined as blocks of the mobile site without preparing or correcting application programs for the display elements one by one.

* * * * *